United States Patent [19]

Otsuki et al.

[11] 3,856,877

[45] Dec. 24, 1974

[54] METHOD FOR ISOMERIZATION OF LOWER POLYMERS OF BUTADIENE

[75] Inventors: Yutaka Otsuki; Hirosuke Imai, both of Yokohama; Atsushi Kaiya, Kawasaki; Hideo Horii, Yokohama, all of Japan

[73] Assignee: Nippon Oil Co., Ltd., Tokyo, Japan

[22] Filed: Nov. 12, 1973

[21] Appl. No.: 414,624

[30] Foreign Application Priority Data
Nov. 15, 1972 Japan.............................. 47-11444

[52] U.S. Cl...... 260/677 R, 260/666 R, 260/668 A, 260/669 R
[51] Int. Cl............................................... C07c 5/24
[58] Field of Search.... 260/677 R, 683.2, 683.15 R, 260/666 R, 683.15 E

[56] References Cited
UNITED STATES PATENTS

| | | | |
|---|---|---|---|
| 3,128,318 | 4/1964 | Meisinger et al........... | 260/683.15 E |
| 3,257,364 | 6/1966 | Eberhardt...................... | 260/688.2 |
| 3,329,736 | 7/1967 | Butte, Jr. et al................ | 260/683.2 |
| 3,379,781 | 4/1968 | Zuech et al..................... | 260/666 R |
| 3,441,629 | 4/1969 | Zuech............................. | 260/683.2 |

FOREIGN PATENTS OR APPLICATIONS

| | | | |
|---|---|---|---|
| 917,358 | 2/1963 | Great Britain.................. | 260/683.2 |

*Primary Examiner*—Delbert E. Gantz
*Assistant Examiner*—Juanita M. Nelson
*Attorney, Agent, or Firm*—Flynn & Frishauf

[57] ABSTRACT

A method for isomerization of lower polymers and copolymers of butadiene which is characterized in that the nonconjugated double bonds in said polymers and copolymers can be isomerized to conjugated double bonds by treating said polymer and copolymers at a temperature of 0 to 200°C in the presence of a catalyst comprising a dispersion of alkali metal and a diamine compound having active hydrogen, thereby polymers or copolymers with high reactivity and useful as paint vehicles, thermosetting materials, adhesives, rubber compounding materials and intermediates for various synthetic reactions, can be obtained.

13 Claims, No Drawings

METHOD FOR ISOMERIZATION OF LOWER POLYMERS OF BUTADIENE

BACKGROUND OF THE INVENTION

1. Field of the Invention which

This invention relates to a method for isomerization of lower polymers of butadiene whic comprises the step of treating a lower polymer of butadiene or a lower copolymer of butadiene with a combination catalyst comprising an alkali metal dispersion and a diamine compound having active hydrogen, thereby isomerizing the non-conjugated double bond in the butadiene unit of the polymer to conjugated double bond.

2. Description of the Prior Art

It is well known that a lower polymer or copolymer of butadiene can be prepared by polymerizing butadiene or copolymerizing it with some other monomer in the presence of an alkali metal catalyst, an organic alkali metal catalyst, or a combination catalyst consisting of a compound of a metal belonging to Group VIII of the periodic table and an alkyl aluminum compound.

As the lower polymer or copolymer of butadiene obtained through such known method has a large amount of 1,2-double bonds and 1,4-double bonds in the polymer molecules, it has a relatively high reactivity, so that the polymer is used in various fields as paint vehicles, thermosetting resins, adhesives, rubber compounding materials, intermediate materials for several synthetic reactions and prepolymers. However, since the double bonds of such lower polymer or copolymer are non-conjugated ones, it is still insufficient with respect to the reactivity as compared with the compounds containing conjugated double bonds in the molecules such as tung oil and dehydrated castor oil. Accordingly, if the non-conjugated double bonds of the butadiene units in the lower polymer or copolymer of butadiene can be isomerized to conjugated double bonds by an economically advantageous method to improve the reactivity thereof, it will be expected to expand further the application fields.

As the known isomerization method in the prior art, there is a method comprising the step of reacting a lower polymer of butadiene at 110° to 250° in the presence of a transition metal catalyst which metal belonging to Group VIII of the periodic table (Japanese Patent Publication No. 5757/(68). This method is, however, defective in that the reaction must be conducted at a high temperature and that undesired gelation and coloration of the polymer are readily caused to occur. Further, said catalyst comprising a compound of a transition metal belonging to Group VIII of the periodic table is expensive, therefore, this method is also disadvantageous from the economical viewpoint.

Further, a method comprising the step of subjecting a lower polymer of butadiene to air oxidation in the presence of a cobalt naphthenate catalyst to improve the reactivity of said polymer is also well known in the prior art (Japanese Patent Publication Nos. 4592/58 and 3865/71). In this method, however, the amount of produced conjugated double bonds is small and the coloration and degradation of the product are caused to occur, which are also disadvantageous.

SUMMARY OF THE INVENTION

In view of the above, we have made extensive research works for developing a method for improving the reactivity of the lower polymer or copolymer of butadiene, and as the result, we found that when a combination catalyst comprising an alkali metal dispersion and a diamine compound having active hydrogen is employed, the non-conjugated double bonds of the butadiene units in said lower polymer can be isomerized to conjugated double bonds at a very high and effective conversion, at a lower temperature without the occurrence of coloration and gelation, and in an economical manner. Thereby, we have accomplished the present invention.

More particularly, in the method of the present invention, the lower polymer of butadiene and lower copolymer of butadiene are treated by a combination catalyst comprising an alkali metal dispersion and a diamine compound having active hydrogen at a temperature in the range of 0° to 200°C with using or without using a solvent, thereby the non-conjugated double bonds in said polymers are isomerized, and thus obtaining the polymers having conjugated dienes.

The lower polymer and lower copolymer of butadiene having conjugated dienes as prepared through the method of the present invention are light-colored and very reactive ones, and may be used for quick-drying paint vehicles, molded articles and intermediate materials for synthetic reactions.

DETAILED DESCRIPTION OF THE INVENTION

As the lower polymer and the copolymer of butadiene for the method of the present invention, those which are prepared according to the conventional method and containing a larger amount of 1,2-double bonds or of 1,4-double bonds, or both 1,2-double bonds and 1,4-double bonds may be employed.

That is, the lower polymer of butadiene or lower copolymer of butadiene obtained by polymerizing butadiene alone or butadiene with other monomer in the presence of an alkali metal or organic alkali metal compound as a catalyst is a typical instance of the lower polymer to be used in this invention. In this case, in order to control the molecular weight and obtain a light-colored lower polymer of a less gel content effectively, there are typically adopted a living polymerization using tetrahydrofuran solvent, and a chain transfer polymerization in which an ether such as dioxane or an alcohol such as isopropyl alcohol is added to the polymerization system and an aromatic hydrocarbon such as toluene or xylene is employed as a chain transfer agent or a solvent. The lower polymers which are obtained through these polymerization methods can be used in the method of the present invention. Furthermore, the lower polymers which are rich in 1,4-double bonds in the butadiene units and prepared by polymerizing butadiene or copolymerizing it with other monomer in the presence of a catalyst of a compound of metal belonging to Group VIII of the periodic table and alkyl aluminum halogenide, may also be used.

The lower copolymers as referred to in this specification and claims include copolymers of butadiene with other conjugated diolefin such as isoprene, 2,3-dimethyl-butadiene and piperylene, or with vinyl-substituted aromatic compounds such as styrene, α-methylstyrene, vinyl toluene and divinylbenzene as the comonomers. In this case, it is preferred that the content of the comonomer units in the copolymer does not exceed 50 mole percent.

The lower polymer or lower copolymer of butadiene in the present invention is liquid or semi-solid at room temperature, and the molecular weight thereof is preferably in the range of 300 to 10,000.

In the method of the present invention, both of the 1,2-double bonds and 1,4-double bonds in the butadiene units can be isomerized to the conjugated diene bonds.

The alkali metal dispersion which is used as one component of the catalyst of the invention may be that of one alkali metal or a mixture of two or more of alkali metals.

The diamine compound having active hydrogen which is used as the other component of the catalyst of the invention can be represented by the following general formula:

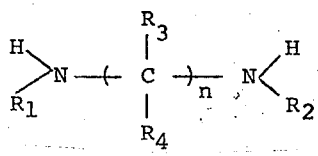

wherein n is an integer of 2 or 3, and each of $R_1$, $R_2$, $R_3$ and $R_4$ is a hydrogen atom or an organic residual group having 1 to 20 carbon atoms. Further, $R_1$ and $R_2$ may be bonded together to form a cyclic structure. Still further, said members $R_1$, $R_2$, $R_3$ and $R_4$ are preferably hydrogen, hydrocarbon residual groups such as alkyl, cycloalkyl and aryl groups, and nitrogen-containing organic residual groups including primary, secondary and tertiary amino groups, and other oxygen-containing or sulfur-containing organic residual groups may also be used. When carboxyl group, hydroxyl group or thiol group is contained in said residual groups, the effect of the alkali metal dispersion as one component of the catalyst is reduced that much.

Typical examples of such diamine compounds are ethylene diamines and propylene diamines such as ethylene diamine, N,N'-dimethyl ethylene diamine, N,N'-diethyl ethylene diamine, propylene diamine and N,N'-dimethyl propylene diamine; polyethylene polyamines represented by the following general formula:

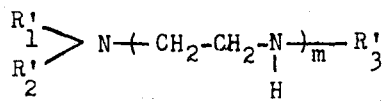

wherein m is an integer of 2 or more, and each of $R_1'$, $R_2'$ and $R_3'$ is a hydrogen atom or a hydrocarbon residual group, such as diethylene triamine, dimethyldiethylene triamine and dimethyltriethylene tetramine; and cyclic diamines such as piperazine.

When the diamine compound having active hydrogen is caused to react with the alkali metal dispersion, considerable color change is caused and the alkali metal dispersion insoluble in hydrocarbons is solubilized by this reaction. Thus, it is suggested that a complex in which the group

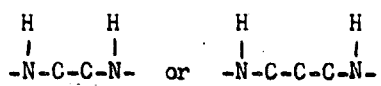

has effectively acted, is formed.

The amount of the diamine compound having active hydrogen to be combined with the alkali metal dispersion is not particularly restricted, it is, however, preferred that the diamine compound is added in an amount of 0.1 to 100 moles equivalents to the alkali metal dispersion (0.1 to 100 moles

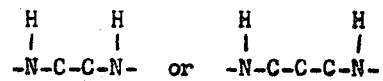

unit of the diamine per mole of alkali metal). Further, a higher isomerizing effect can be expected when the diamine compound is used in an amount of 0.5 to 10 mole equivalents to the alkali metal dispersion. when the amount of the diamine compound as used is too small, the formation of complex having isomerizing activity is inhibited, while when the amount of the diamine compound as used is too large, any desirable increase of the catalytic activity can not be obtained resulting in an economical disadvantage.

In the method of the present invention, the amount of the alkali metal to be used is not particularly restricted, it is, however, preferred that the alkali metal is used in an amount of 1 millimole to 1 mole, more preferably 10 millimoles to 100 millimoles, per 100 grams of the polymer.

The isomerization using the catalyst of the invention may be conducted in the absence of a solvent when the viscosity of the polymer is low, while if the viscosity of the polymer is high, a solvent dissolving the polymer and giving no undesirable influence to the isomerization reaction, such as aliphatic hydrocarbons and aromatic hydrocarbons, is preferably employed.

The isomerization using the catalyst of the present invention can be carried out at a temperature of 0° to 200°C, preferably 30° to 150°C.

In order that those skilled in the art may better understand the present invention and the manner in which it may be practised, the following specific examples are given.

EXAMPLE 1

One hundred grams of polybutadiene having a molecular weight of 1,200 (1,2-double bond content: 88 percent and trans-double bond content: 12 percent was dissolved in 50 cc of benzene, and 20 millimoles of sodium dispersion and 40 millimoles of ethylenediamine were added to the solution. The mixture was then caused to react in the presence of nitrogen current at 70°C for 3 hours. Thereafter, 6 cc of methanol was added to the reaction mixture to deactivate the catalyst, then the reaction mixture was washed several times with 0.1N hydrochloric acid and water to remove the sodium compound and amine compound. After that, the solvent was distilled off under reduced pressure to obtain a light-colored polymer free of the alkali metal.

The diene value of the obtained polymer was 280. When a composition comprising 100 parts by weight of said polymer and 1 part by weight of cobalt naphthenate (in the form of 6 percent solution) was coated in a thickness of 30 microns and dried at room temperature, the tack free state was obtained in 3 hours and the complete curing in 6 hours.

On the other hand, a composition comprising 100 parts by weight of the starting polymer having a diene value of 0.3 and 1 part by weight of cobalt naphthenate (in the form of 6 percent solution) was coated in a thickness of 30 microns. When the coating was dried at room temperature, the tack free state was obtained in 25 hours and the complete curing in 50 hours. In view of the above tests, it will be readily understood that the reactivity of the starting polybutadiene was highly improved by the isomerization according to the present invention.

EXAMPLES 2 TO 6 AND COMPARATIVE EXAMPLES 1 TO 4

One hundred grams of polybutadiene having a molecular weight of 1,000 was dissolved in 100 cc of toluene, 20 millimoles of sodium dispersion was then added to the mixture, and an amine was further added in each Example. Further, the mixture was caused to react in the presence of nitrogen current at 80°C for 3 hours, and then treated in like manner as the foregoing Example 1. The results of which are shown in the following Table 1.

Table 1

| Example Number | Amine Compound Kind | Amount (m.mole) | Trans(*) Content (%) | Vinyl(*) Content (%) | Diene Value | Track Free (hr) | Complete Curing (hr) |
|---|---|---|---|---|---|---|---|
| — | Starting Polymer | — | 10 | 72 | 0.5 | 25 | 50 |
| Example 2 | $H_2N-CH_2CH_2-NH_2$ | 40 | 11 | 50 | 20 | 3 | 6 |
| " 3 | $H_2N-CH_2CH_2-NH-CH_2CH_2-NH_2$ | 40 | 10 | 46 | 24 | 2 | 5 |
| " 4 | $H_2N-CH_2CH_2-NH-CH_2CH_2-NH-CH_2CH_2-NH_2$ | 40 | 12 | 52 | 18 | 4 | 8 |
| " 5 | $H_2N-CH_2CH_2CH(CH_3)-NH_2$ | 40 | 12 | 50 | 21 | 3 | 7 |
| " 6 | $\begin{array}{c}CH_2CH_2\\NH\diagup\quad\diagdown NH\\CH_2CH_2\end{array}$ | 40 | 10 | 58 | 14 | 6 | 12 |
| Comparative Example 1 | Not added | 0 | 10 | 72 | 0.5 | 25 | 50 |
| " 2 | $NEt_3$ | 40 | 10 | 72 | 0.6 | 25 | 50 |
| " 3 | pyridine | 40 | 10 | 72 | 0.6 | 25 | 50 |
| " 4 | $\begin{array}{c}CH_3\\ \diagdown\\ CH_3\end{array}N-CH_2CH_2N\begin{array}{c}CH_3\\ \diagup\\ CH_3\end{array}$ | 40 | 10 | 70 | 0.8 | 24 | 50 |

The double bond contents were determined by infrared spectrophotometry with use of the extinction coefficient of Morero. it is considered that the reason why the sum of the trans and vinyl contents is not 100 percent comes from the fact that the terminal double bonds are not calculated and some of double bonds are lost by cyclization.

As will be apparent from the results shown in the foregoing Table 1, the conjugated diene units are formed at a very high conversion by the method of this invention, and quick drying product can be obtained, whereas the tertiary amines such as triethylamine, pyridine and tetramethylethylene diamine do not cause the isomerization of the polymer. It is considered that this is due to the fact that such amines do not form complexes with the metallic sodium.

EXAMPLES 7 AND 8, AND COMPARATIVE EXAMPLES 5 TO 7

One hundred grams of polybutadiene having a molecular weight of 1,050 was dissolved in 50 cc of toluene, then 20 millimoles of sodium dispersion was added to the solution, and further a primary amine or secondary amine was added to the above solution in each Example. Then the reaction was carried out in the same maner as that in Example 2 to obtain the results shown in the following Table 2.

Table 2

| Example Number | Amine Compound | | Properties of Polymer | | | | Coating Drying Rate at Room Temperature | |
|---|---|---|---|---|---|---|---|---|
| | Kind | Amount (m.mole) | Trans Content (%) | Vinyl Content (%) | Diene Value | | Tack Free (hr) | Complete Curing (hr) |
| — | (Starting Polymer) | — | 13 | 70 | 0.8 | | 25 | 50 |
| Example 7 | $H_2N-CH_2CH_2-NH_2$ | 40 | 12 | 40 | 32 | | 2 | 4 |
| " 8 | $H_2N-CH_2CH_2-NH-CH_2CH_2-NH_2$ | 30 | 11 | 50 | 25 | | 3 | 6 |
| Comparative Example 5 | $NEt_2H$ | 40 | 13 | 71 | 1.5 | | 24 | 50 |
| " 6 | $H_2N-(CH_2)_6-NH_2$ | 40 | 13 | 70 | 1.0 | | 25 | 50 |
| " 7 | $H_2N-\text{C}_6H_4-NH_2$ | 40 | 13 | 70 | 0.9 | | 25 | 50 |

As will be apparent from the results in Table 2, the isomerization can be effectively caused through the method of the present invention, while when a primary or secondary amine is used, if it is a mono-amine, no isomerizing activity is expected. Further, in case of a diamine which has no complex-forming property such as hexamethylene diamine or p-phenylene diamine, the isomerization is not caused to occur.

EXAMPLE 9

Eight hundred grams of butadiene copolymer (1,2-double bond content: 90 percent, trans-double content: 10 percent, and styrene content: 10 percent was dissolved in 2,200 g. of benzene, and 200 millimoles of sodium dispersion and 800 millimoles of ethylenediamine were added to the solution. Thus obtained mixture was caused to react in the presence of nitrogen current at 70°C for 8 hours, and the resulting reaction product was washed with water until no alkali was detected. Thereafter, benzene was removed from the reaction product by distillation to obtain an isomerized butadiene copolymer.

Thus obtained copolymer had a molecular weight of 1,700, a Gardner color number of 5 and a diene value of 23. A coating of 30 microns was formed by using a composition of 100 parts by weight of said copolymer and 1 part by weight of cobalt naphthenate (in the form of 6 percent solution), and the coating was dried at room temperature, in which the tack free state was attained in 4 hours and the complete curing took 8 hours.

EXAMPLE 10

One hundred grams of cis-polybutadiene having a molecular weight of 1,750 (cis-double bond content: 75 percent, trans-double bond content; 19 percent and 1,2-double bond content: 6 percent) was dissolved in 100 cc of toluene, and 20 millimoles of sodium dispersion and 40 millimoles of ethylenediamine were added to the above solution. Thus obtained mixutre was then caused to react at 70°C for 3 hours in the presence of nitrogen current. After the reaction, methanol was added to the reaction mixture to deactivate the catalyst, and 20 g. of activated clay was further added and stirred vigorously. Thereafter, the mixture was filtered, and the solvent and remaining ethylenediamine were distilled off.

Thus obtained polymer had a molecular weight of 1,800 and a diene value of 32. As the result of infrared absorption spectrum analysis, it was found that the polymer had a cis-double bond content of 50 percent, trans-double bond content of 10 percent and vinyl-double bond content of 5 percent, thereby it is apparent that the 1,4-double bond can also be isomerized in the method of the present invention.

EXAMPLES 11 TO 13, AND COMPARATIVE EXAMPLES 8 TO 10

In each example, 100 grams of polybutadiene having a molecular weight of 750 (1,2-double bond content: 84 percent and trans-double bond content: 16 percent) was dissolved in 200 cc of benzene, and 40 millimoles of ethylenediamine and 20 millimoles of alkali metal dispersion were added to the above solution. Then the above mixture was caused to react at 50°C for 5 hours. The results of analyses of the obtained polymers and shown in the following Table 3. The similar reactions were conducted in like manner as the above except that ethylene diamine was not added, and the results thereof are also shown in the following Table 3 as Comparative Examples.

Table 3

| | Alkali Metal | Ethylenediamine | Diene Value |
|---|---|---|---|
| — | (Starting polymer) | — | 0.1 |
| Comparative Example 8 | lithium | not added | 1.5 |
| Example 11 | do. | added | 15 |
| Comparative Example 9 | sodium | not added | 0.8 |
| Example 12 | do. | added | 14 |
| Comparative Example 10 | potassium | not added | 1.0 |
| Example 13 | do. | added | 18 |

It will be understood from the results of the above Table 3 that the method of the present invention is very excellent in like manner as the foregoing examples.

It should be emphasized, however, that the specific examples shown herein are intended as merely illustrative and in no way restrictive of the invention.

What is claimed is:

1. A method for the isomerization of a lower polymer of butadiene or lower copolymer of butadiene and at least one member selected from the group consisting of a conjugated diolefin and a vinyl-substituted aromatic compound, which is characterized in that the non-conjugated double bonds in said polymers and copolymers are isomerized to conjugated double bonds by treating said polymers and copolymers at a temperature of 0° to 200°C in the presence of a catalyst comprising:

a dispersion of an alkali metal selected from the group consisting of lithium, sodium and potassium, and a diamine compound represented by the general formula:

wherein n is an integer of 2 or 3, each of $R_1$, $R_2$ $R_3$ and $R_4$ is a hydrogen atom or an organic residual group having 1 to 20 carbon atoms, and $R_1$ and $R_2$ can be bonded together to form a cyclic structure.

2. A method for isomerization as claimed in claim 1, wherein said lower polymer or copolymer of butadiene is liquid or semi-solid at room temperature and has a molecular weight of 300 to 10,000.

3. A method for isomerization as claimed in claim 1, wherein said lower copolymer of butadiene is a copolymer of butadiene with aa comonomer selected from the group consisting of isoprene, 2,3-dimethylbutadiene, piperylene, styrene, α-methylstyrene, vinyl toluene and divinylbenzene, and the content of said comonomer being 50 mole percent or less.

4. A method for isomerization as claimed in claim 1, wherein said treatment is carried out in a solvent selected from aliphatic hydrocarbons and aromatic hydrocarbons.

5. a method for isomerization as claimed in claim 1, wherein said diamine compound is a member selected from the group consisting of ethylene diamine, N,N'-dimethyl ethylene diamine, N,N'-diethyl ethylene diamine, propylene diamine and N,N'-dimethyl propylene diamine.

6. A method for isomerization as claimed in claim 1, wherein said diamine compound is a polyethylene polyamine represented by the following general formula:

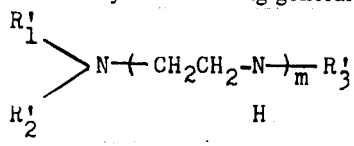

wherein m is an integer of 2 or more, and each of $R_1$, $R_2$ and $R_3$ is a hydrogen atom or a hydrocarbon residual group.

7. A method for isomerization as claimed in claim 6, wherein said polyethylene polyamine is a member selected from the group consisting of diethylene triamine, diemthyl diethylene triamine and dimethyl triethylene tetramine.

8. A method for isomerization as claimed in claim 1, wherein said diamine compound is cyclic diamine.

9. A method for isomerization as claimed in claim 1, wherein said alkali metal dispersion is used in an amount of 1 millimole to 1 mole per 100 grams of said polymer or copolymer of butadiene.

10. A method for isomerization as claimed in claim 1, wherein said alkali metal dispersion is used in an amount of 10 to 100 millimoles per 100 grams of said polymer of copolymer of butadiene.

11. A method for isomerization as claimed in claim 1, wherein said diamine compound is used in an amount of 0.1 to 100 mole equivalents to said alkali metal dispersion.

12. A method for isomerization as claimed in claim 11, wherein said diamine compound is used in an amount of 0.5 to 10 mole equivalents to said alkali metal dispersion.

13. A method for isomerization as claimed in claim 1, wherein said treatment is carried out at a temperature of 30° to 150°C.

* * * * *

UNITED STATES PATENT OFFICE
CERTIFICATE OF CORRECTION

PATENT NO. : 3,856,877
DATED : December 24, 1974
INVENTOR(S) : YUTAKA OTSUKI et al It is certified that error appears in the above-identified patent and that said Letters Patent are hereby corrected as shown below:

First column, at "[30]": replace "47-11444" with

--- 47-114444 --- .

Column 1, line 5: delete "which".

Column 1, line 7: replace "whic" with --- which --- .

Column 4, line 41: after "12 percent", close parentheses (insert --- ) --- ).

Column 7, line 3: replace "it" with --- It --- .

Column 8, line 12: replace "maner" with --- manner --- .

Column 9, line 12: after "10 percent" (second occurrence), close parentheses (insert --- ) --- ).

Column 10, Claim 3, line 3: "aa" should be --- a --- .

Column 11, Claim 7, line 4: replace "diemthyl" with

--- dimethyl --- .

Signed and Sealed this twenty-sixth Day of August 1975

[SEAL]

Attest:

RUTH C. MASON
Attesting Officer

C. MARSHALL DANN
Commissioner of Patents and Trademarks